(12) United States Patent
Fetterman et al.

(10) Patent No.: US 10,545,221 B2
(45) Date of Patent: Jan. 28, 2020

(54) APPARATUS AND METHOD FOR DETECTING ALIGNMENT OF SENSOR IN AN AUTOMOTIVE DETECTION SYSTEM

(71) Applicant: Veoneer US, Inc., Southfield, MI (US)

(72) Inventors: Matthew Fetterman, Waltham, MA (US); Mikhail Rubnich, Newton, MA (US)

(73) Assignee: Veoneer, Inc., Southfield, MI (US)

( * ) Notice: Subject to any disclaimer, the term of this patent is extended or adjusted under 35 U.S.C. 154(b) by 319 days.

(21) Appl. No.: 15/602,590

(22) Filed: May 23, 2017

(65) Prior Publication Data

US 2018/0341007 A1 Nov. 29, 2018

(51) Int. Cl.
*G01S 7/40* (2006.01)
*G01S 7/497* (2006.01)
*G01S 13/93* (2006.01)
*G01S 17/93* (2006.01)

(52) U.S. Cl.
CPC .......... *G01S 7/4026* (2013.01); *G01S 7/4972* (2013.01); *G01S 13/931* (2013.01); *G01S 17/936* (2013.01); *G01S 2007/403* (2013.01); *G01S 2013/9332* (2013.01)

(58) Field of Classification Search
CPC .... G01S 7/4026; G01S 13/589; G01S 17/936; G01S 17/42; G01S 13/931; G01S 7/4972; G01S 2013/9367; G01S 2013/9375; G01S 2007/4091; G01S 2013/9332; G01S 2007/403
USPC ...................................................... 342/173
See application file for complete search history.

(56) References Cited

U.S. PATENT DOCUMENTS 6,202,027 B1  3/2001  Alland et al.
7,304,602 B2  12/2007 Shinagawa et al.
9,500,742 B2  11/2016 Poiger et al.
(Continued)

FOREIGN PATENT DOCUMENTS

WO   2016/198563   12/2016

OTHER PUBLICATIONS

International Search Report and Written Opinion in corresponding International Application No. PCT/US2018/033830 dated Nov. 6, 2018; 13 pages.

*Primary Examiner* — Frank J McGue
(74) *Attorney, Agent, or Firm* — Burns & Levinson, LLP; Steven M. Mills

(57) ABSTRACT

An automotive detection system includes a signal transmitter and a receiver, which generates receive signals indicative of reflected signals. A processor (i) receives the receive signals, (ii) processes the receive signals to generate detections of one or more objects in the region, each of the detections being associated with a position in a two-dimensional orthogonal coordinate system in a plane in which the sensor is moving, (iii) detects a pattern of detections in the two-dimensional orthogonal coordinate system by determining a quantity of detections having coordinates in a rectangular region within the two-dimensional orthogonal coordinate system, (iv) determines an angle of an axis of the rectangular region with respect to a reference direction in the two-dimensional orthogonal coordinate system, and (v) determines an angle of misalignment of the sensor from the angle of the axis of the rectangular region with respect to the reference direction.

24 Claims, 13 Drawing Sheets

(56) References Cited

U.S. PATENT DOCUMENTS

2015/0362587 A1* 12/2015 Rogan ................... G01S 17/89
                                                         702/104
2016/0209211 A1*  7/2016 Song ..................... G01B 21/24
2016/0223649 A1*  8/2016 Schwindt ............. G01S 7/4026

* cited by examiner

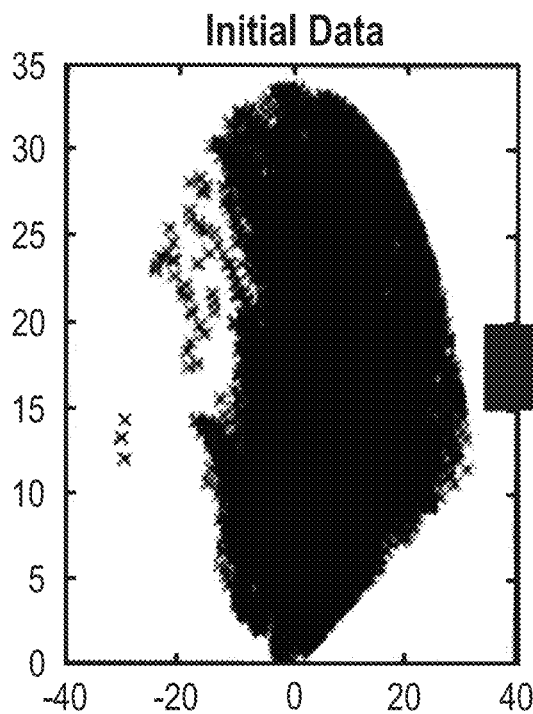
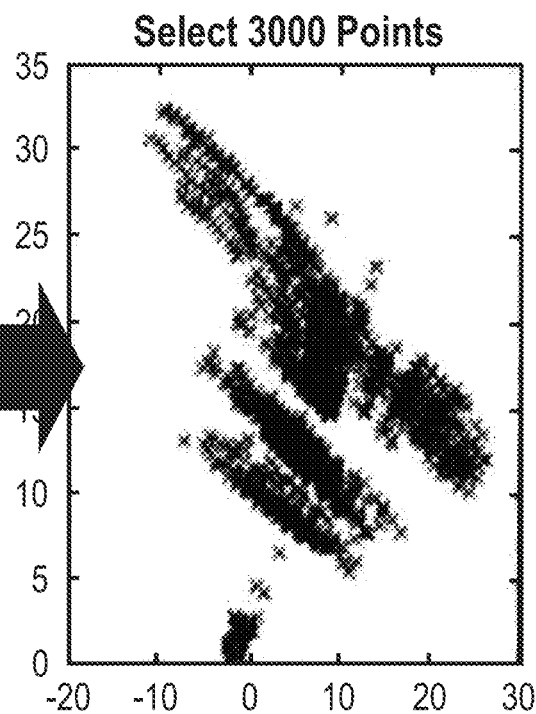
*Fig. 6A*  *Fig. 6B*
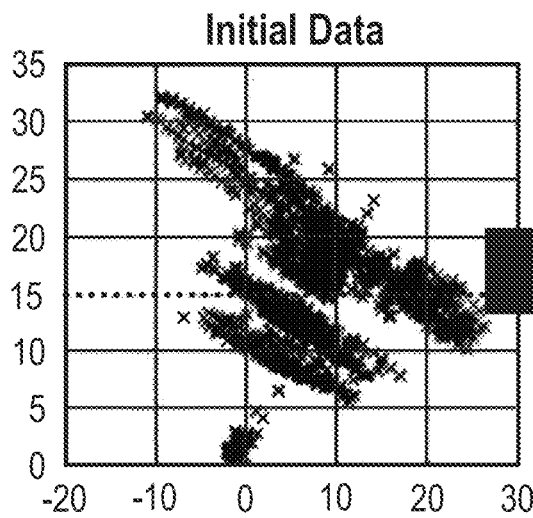
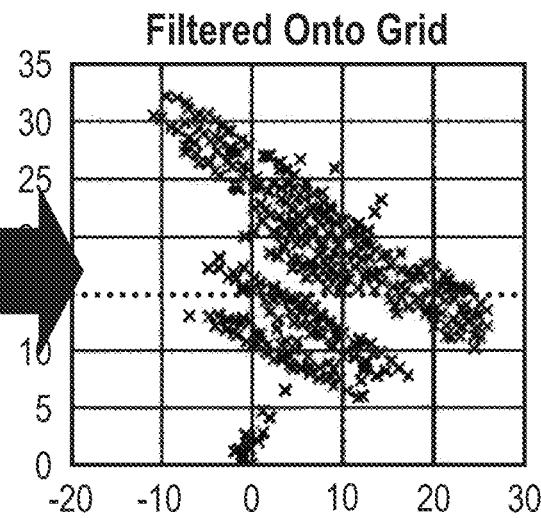
*Fig. 6C*  *Fig. 6D*

Detections for 20 Degree Misalignment

Grid at 0 Degrees

Number of Detections: 3, 5, 10, 10, 11, 9, 7, 5, 4, 3
Sum of Top 5: 11 + 10 + 10 + 9 + 7 = 47

Grid at 10 Degrees

Number of Detections: 4, 5, 8, 14, 13, 3, 7, 7, 7, 6, 4
Sum of Top 5: 14 +13 + 8 + 7 + 7 = 49

Grid at 15 Degrees

Number of Detections: 3, 7, 7, 13, 12, 9, 8, 8, 6, 6, 2
Sum of Top 5: 13 +12 + 9 + 8 + 8 = 50

APPARATUS AND METHOD FOR DETECTING ALIGNMENT OF SENSOR IN AN AUTOMOTIVE DETECTION SYSTEM

BACKGROUND

1. Technical Field

The present disclosure is related to automotive detection systems, e.g., radar, LiDAR systems, and, in particular, to an apparatus and method for detecting and correcting for misalignment of a sensor in an automotive detection system.

2. Discussion of Related Art

In automotive detections systems, such as radar systems or LiDAR systems, the sensor, i.e., radar sensor or LiDAR sensor, can be mounted, i.e., physically attached, to the vehicle body or frame. Detection system performance is typically characterized by detection of reflections from objects in proximity to the vehicle to enable implementation of speed control and collision preventions. In such automotive detection systems, it is typically desirable to determine an azimuth angle in the form of a target object bearing angle, the range or distance with respect to the objects, and a Doppler relative velocity between the vehicle and these objects.

For typical vehicle detection applications, it is important to measure the target bearing angle with very high precision. The angle accuracy of a detection system depends on fundamental parameters such as modulation technique, antenna design, component tolerances, assembly precision and/or installation conditions. Furthermore, due to various environmental influences such as mechanical stress or bad weather, the angle estimation performance might be degraded. Some of these error sources exhibit a random statistical distribution, while others result in a fixed-angle offset of the sensor module. Monitoring and correcting for misalignment angle can be important in vehicle detection applications.

There are several known approaches to sensor misalignment monitoring and correction which use vehicle dynamic information, e.g., vehicle speed, yaw rate or steering angle, to verify trajectories of ground stationary target objects. By comparing the expected path of an obstacle with the actual progression of the observations, one should be able to estimate the common bearing bias. The success of these techniques depends strongly on the vehicle dynamic data.

SUMMARY

According to one aspect, an automotive detection system with monitoring of misalignment of a sensor of the system is provided. A signal transmitter transmits transmitted signals into a region. A receiver receives reflected signals generated by reflection of the transmitted signals and generates receive signals indicative of the reflected signals. A processor coupled to the receiver (i) receives the receive signals, (ii) processes the receive signals to generate detections of one or more objects in the region, each of the detections being associated with a position in a two-dimensional orthogonal coordinate system in a plane in which the sensor is moving, (iii) detects a pattern of detections in the two-dimensional orthogonal coordinate system by determining a quantity of detections having coordinates in a rectangular region within the two-dimensional orthogonal coordinate system, (iv) determines an angle of an axis of the rectangular region with respect to a reference direction in the two-dimensional orthogonal coordinate system, and (v) determines an angle of misalignment of the sensor from the angle of the axis of the rectangular region with respect to the reference direction.

In some exemplary embodiments, the automotive detection system is a radar system, the signal transmitter is a radar signal transmitter, the transmitted signals are transmitted radar signals, the reflected signals are reflected radar signals, and the sensor is a radar sensor.

In some exemplary embodiments, the automotive detection system is a LiDAR system, the signal transmitter is a LiDAR signal transmitter; the transmitted signals are transmitted LiDAR signals; the reflected signals are reflected LiDAR signals; and the sensor is a LiDAR sensor.

In some exemplary embodiments, the processor filters the detections by limiting a quantity of detections in each of a plurality of two-dimensional grids within the two-dimensional orthogonal coordinate system.

In some exemplary embodiments, the reference direction is the direction in which the sensor is moving in the plane.

In some exemplary embodiments, the line of detections is concluded by the processor to be associated with an object which is stationary with respect to the sensor. The object can include a tree near a road on which the sensor is moving.

In some exemplary embodiments, if the angle of misalignment of the sensor exceeds a threshold angle, then an alert is issued. In response to the alert, at least one feature of the system, such as a blind spot detection feature or a rear cross traffic detection feature, can be disabled. The alert can indicate that the sensor is inverted with respect to a prescribed orientation.

According to another aspect, a method for monitoring alignment of a sensor in an automotive detection system is provided. The method includes: transmitting transmitted signals into a region; receiving reflected signals generated by reflection of the transmitted signals and generating receive signals indicative of the reflected signals; receiving the receive signals; processing the receive signals to generate detections of one or more objects in the region, each of the detections being associated with a position in a two-dimensional orthogonal coordinate system in a plane in which the sensor is moving; detecting a pattern of detections in the two-dimensional orthogonal coordinate system by determining a quantity of detections having coordinates in a rectangular region within the two-dimensional orthogonal coordinate system; determining an angle of an axis of the rectangular region with respect to a reference direction in the two-dimensional orthogonal coordinate system; and determining an angle of misalignment of the sensor from the angle of the axis of the rectangular region with respect to the reference direction.

In some exemplary embodiments, the automotive detection system is a radar system, the transmitted signals are transmitted radar signals, the reflected signals are reflected radar signals; and the sensor is a radar sensor.

In some exemplary embodiments, the automotive detection system is a LiDAR system, the transmitted signals are transmitted LiDAR signals, the reflected signals are reflected LiDAR signals, and the sensor is a LiDAR sensor.

In some exemplary embodiments, the detections are filtered by limiting a quantity of detections in each of a plurality of two-dimensional grids within the two-dimensional orthogonal coordinate system.

In some exemplary embodiments, the reference direction is the direction in which the sensor is moving in the plane._

In some exemplary embodiments, the line of detections is concluded to be associated with an object which is stationary with respect to the sensor. The object can include a tree near a road on which the sensor is moving.

In some exemplary embodiments, if the angle of misalignment of the sensor exceeds a threshold angle, then an alert is issued. In response to the alert, at least one feature of the system, such as a blind spot detection feature or a rear cross traffic detection feature, can be disabled. The alert can indicate that the sensor is inverted with respect to a prescribed orientation.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIGS. 6A through 6D include schematic plots of raw target clutter object detections and approaches to limiting the quantity of detections, according to some exemplary embodiments.

DETAILED DESCRIPTION

Figure 1:
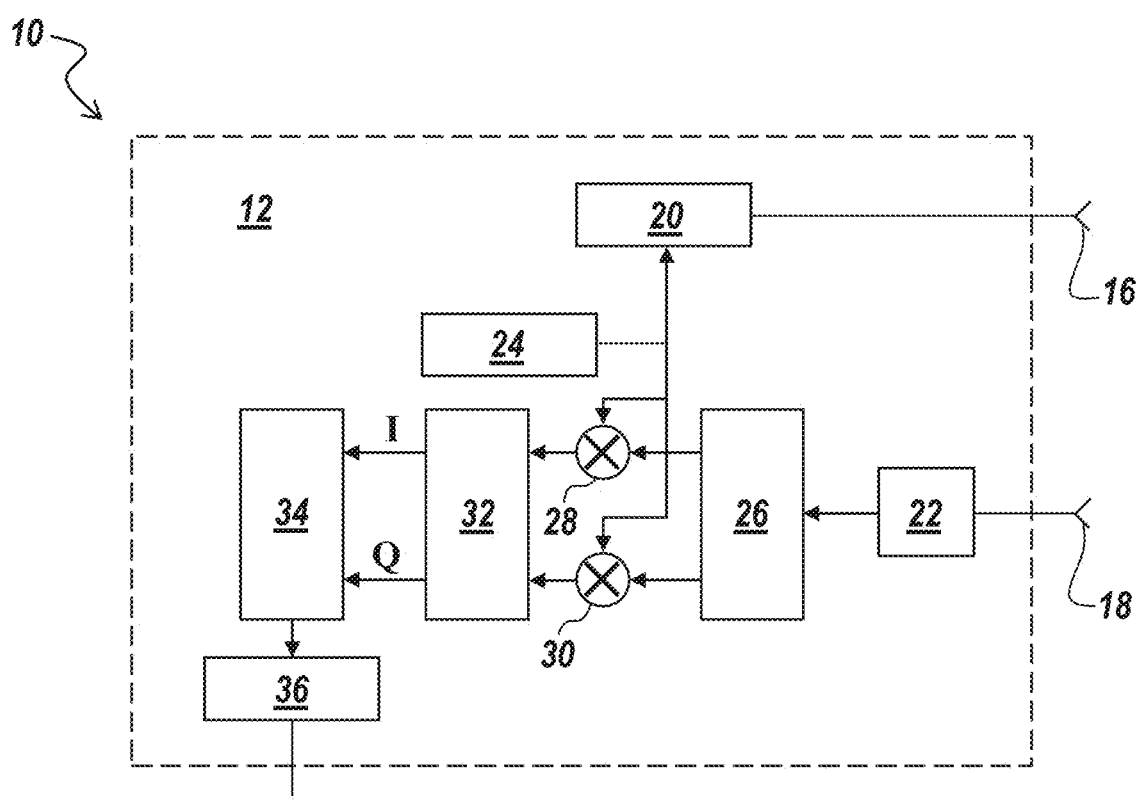
FIG. 1 includes a schematic block diagram of an automotive radar sensor module for processing automotive radar signals, in accordance with some exemplary embodiments.

FIG. 1 includes a schematic block diagram of an automotive detection system 10, such as an automotive radar system or automotive LiDAR system. It is noted that, although the following detailed description refers to system 10 as an automotive radar system, merely as an exemplary illustrative embodiment, the present disclosure is directed to automotive detection systems in general and can be, for example, automotive radar systems, automotive LiDAR systems, or other such detection systems. The description herein of radar system components and signal processing are applicable to analogous components and signal processing of LiDAR systems. System 10 of FIG. 1 includes one or more detection modules such as radar sensor modules 12 for processing automotive radar signals, in accordance with some exemplary embodiments. Referring to FIG. 1, system 10 includes one or more radar modules 12, which process radar transmit and receive signals which are compatible with the radar detection and monitoring system 10 in the host automobile. Radar module 12 generates and transmits radar signals into the region adjacent to the host vehicle that is being monitored by system 10. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as pulse shaping/timing circuitry, transmit trigger circuitry, RF switch circuitry, or any other appropriate transmit circuitry used by radar system 10.

Radar module 12 also receives returning radar signals at radar receive circuitry 22 via receive antenna 18. Radar receive circuitry 22 generally includes any circuitry required to process the signals received via receive antenna 18, such as pulse shaping/timing circuitry, receive trigger circuitry, RF switch circuitry, or any other appropriate receive circuitry used by the radar system. The received radar signals are processed by radar receive circuitry 22 to generate processed receive signals, which are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively. The resulting difference signals are further filtered as required by filtering circuitry 32 to generate baseband I and Q signals, labeled "I" and "Q" in FIG. 1. The baseband I and Q signals are digitized by analog-to-digital converter circuitry (ADC) 34. In automotive radar systems, these digitized I and Q baseband signals are processed by a processor, such as a digital signal processor (DSP) 36, to generate target object detections related to objects in the region being monitored by radar system 10. In some exemplary embodiments, the DSP 36 can perform any and/or all of the processing tasks required to implement the sensor alignment monitoring, compensation and/or correction described herein according to the exemplary embodiments.

Figure 2:
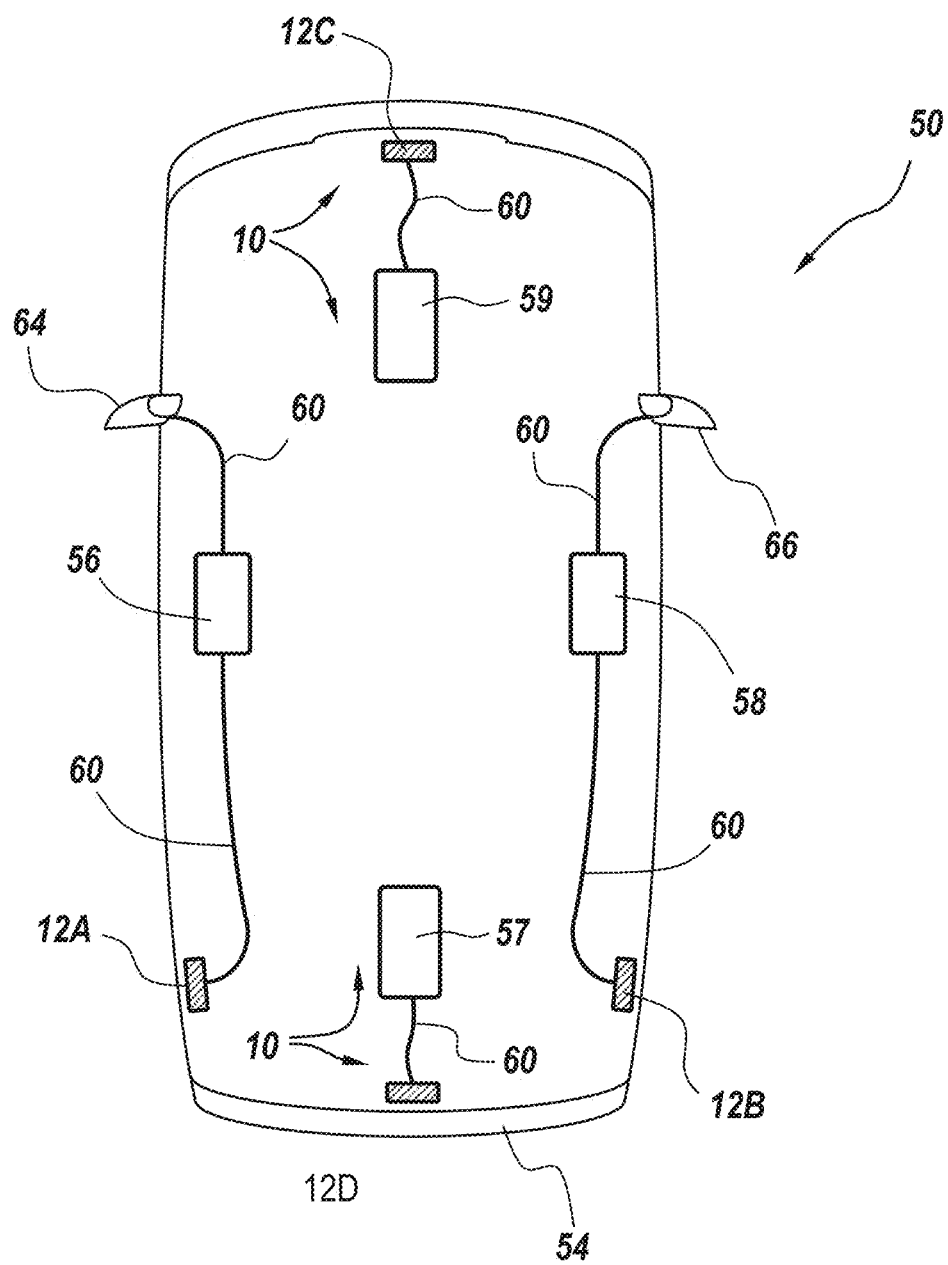
FIG. 2 includes a schematic top view of an automobile or vehicle equipped with a radar system, which includes one or more radar sensor modules, according to some exemplary embodiments.

FIG. 2 includes a schematic top view of an automobile or vehicle 50 equipped with detection system 10, which includes one or more radar sensor modules 12. A first radar sensor module 12A is connected via a bus 60, which in some exemplary embodiments is a standard automotive controller area network (CAN) bus, to a first CAN bus electronic control unit (ECU) 56. Object detections from radar sensor module 12A can be reported to ECU 56, which processes the detections and can provide detection alerts via CAN bus 60. In some exemplary embodiments, the alerts can be in the form of a visible indicator, such as a light-emitting diode (LED) in side mirror 64, which is visible to the driver. Similarly, in some exemplary embodiments, a second radar sensor module 12B can be connected via CAN bus 60, to a second CAN bus electronic control unit (ECU) 58. Object detections from radar sensor module 12B can be reported to ECU 58, which processes the detections and can provide detection alerts via CAN bus 60 to a visible indicator, such as a light-emitting diode (LED) in side mirror 66. In the particular embodiment illustrated in FIG. 2, first and second radar sensor modules 12A and 12B of radar system 10 are part of a blind spot system for reporting object detections in one or both blind spots of automobile 50. It will be understood that the present disclosure is applicable to other types of radar systems 10. For example, in some exemplary embodiments, forward-looking radar sensor module 12C can be connected via CAN bus 60 to a third CAN bus electronic control unit (ECU) 59, and rear-looking radar sensor module 12D can be connected via CAN bus 60 to a fourth CAN bus electronic control unit (ECU) 57. ECUs 57 and 59 can process target object detections from radar sensor modules 12C and 12D, respectively, and can provide detection alerts to a visible indicator or to a vehicle system process for appropriate processing and management of detections.

Figure 3:
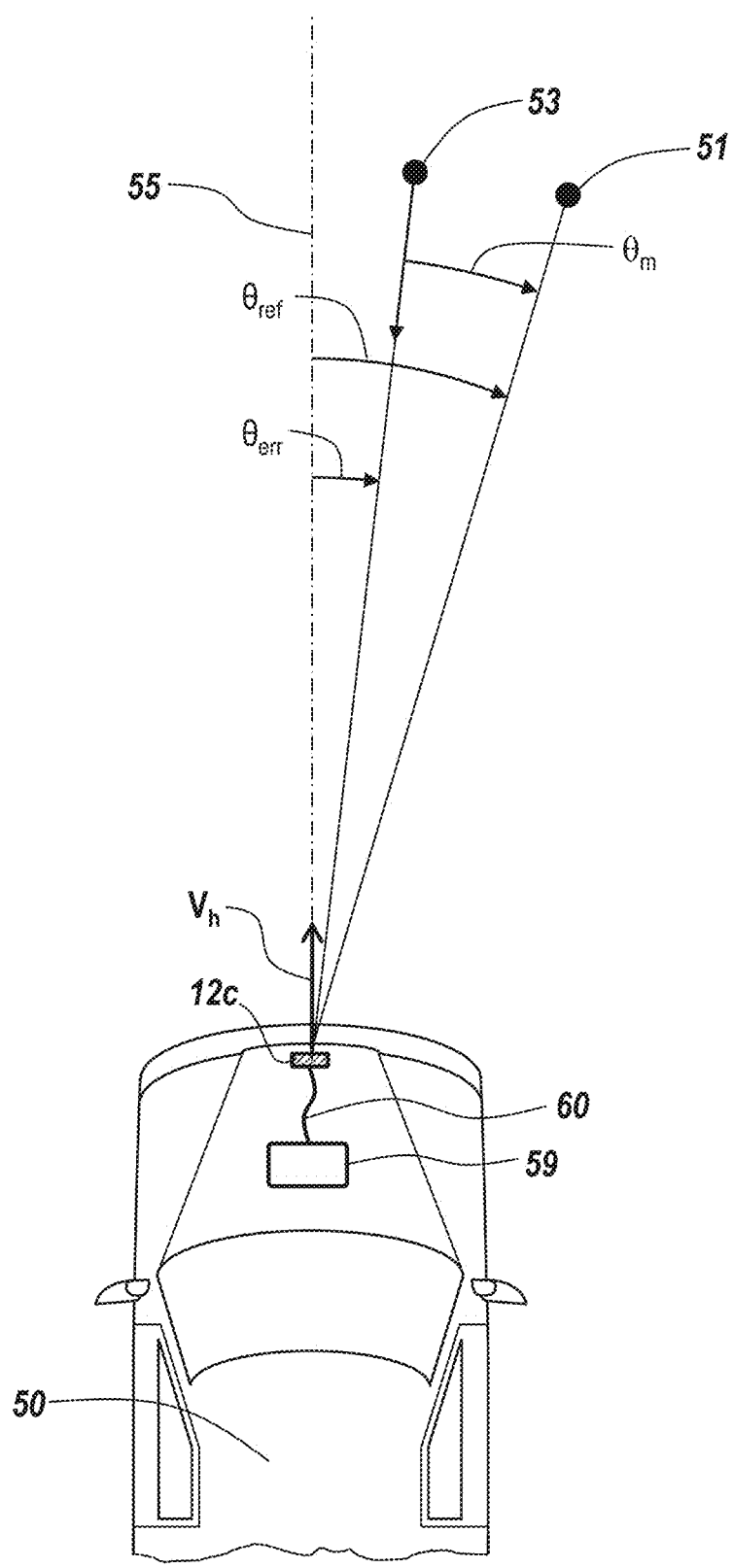
FIG. 3 includes a schematic top view of a portion of automobile or vehicle equipped with radar system, including a forward-looking radar sensor module, illustrating misalignment of the radar sensor module.

FIG. 3 includes a schematic top view of a portion of automobile or vehicle 50 equipped with radar system 10, including forward-looking radar sensor module 12C, illustrating misalignment of radar sensor module 12C. Referring to FIG. 3, generally, vehicle 50 is moving with a vehicle velocity $V_h$, which can be zero, i.e., vehicle 50 may be stationary. A target object 51, which is detected by radar sensor module 12C, can be present in the path of vehicle 50. However, due to misalignment error, target object 51 is detected as target object 53, which differs from the actual real target object 51. As a result, there exists a true target angle $\Theta_{ref}$ for the real target object 51 and a detected target angle $\Theta_{err}$ for the detected target object 53, where these angles are measured from a line 55 that extends from vehicle 50, in its forward direction, as shown in FIG. 3 extending along the velocity $V_h$, which can be considered to extend along the radar boresight of the radar sensor module 12C.

In automotive radar systems, sensor alignment is important to proper operation of the system. The system and each sensor must have verification of alignment of each sensor in the system. To that end, according to the present disclosure, a fast, efficient and accurate means for determining and correcting for sensor misalignment is provided. According to the approach of the present disclosure, a relatively large quantity of detections are taken over a time interval, for example, 30 seconds. In some exemplary embodiments, these detections are detections of clutter objects, such as pedestrians, poles, cars, trees, signs and/or other stationary and/or non-stationary, i.e., moving, clutter objects adjacent to the travel path of the vehicle. When plotted on an x-y orthogonal-axis Cartesian coordinate plane, i.e., the horizontal x-y plane in which the vehicle is moving, these multiple detections of a single clutter object, e.g., tree, will appear as patterns, for example, lines, extending in the x-y plane. An angle of these patterns, i.e., lines, can be used to determine the orientation, i.e., misalignment angle, of the sensor. That is, the angle of a line formed by these multiple detections of the same clutter object with respect to the line of the vehicle's travel path indicates an angle of misalignment of the sensor. This angle of misalignment can be used to alert the operator that the sensor is misaligned, for example by incorrect installation. The operator can then take appropriate steps to correct the misalignment, such as by correcting the installation of the sensor. The misalignment angle can also and/or alternatively be used as a calibration/correction factor applied to subsequent detection processing to provide more accurate detection processing. One particular advantage of the approach of the present disclosure is that it does not rely on Doppler velocity information, which can be subject to ambiguity.

Figure 4:
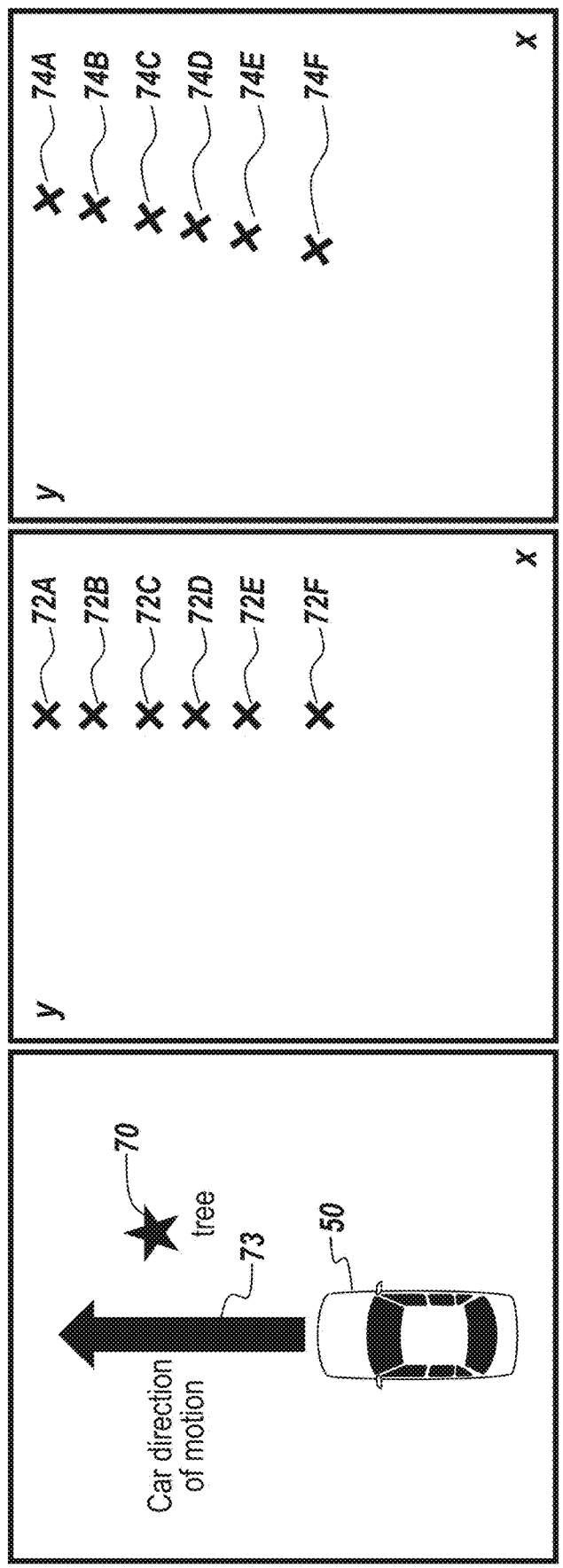
FIG. 4A includes a schematic diagram of a vehicle equipped with an automotive radar system moving along a path in the presence of a stationary clutter object, for example, a tree.
FIG. 4B includes a plot in the x-y plane of multiple detections of the clutter object, i.e., tree, obtained by the automotive radar system in the vehicle of FIG. 4A as the vehicle moves along the path.
FIG. 4C includes a plot in the x-y plane of multiple detections of the clutter object, i.e., tree, obtained by the automotive radar system in the vehicle of FIG. 4A as the vehicle moves along the path, with radar sensor misalignment.

FIGS. 4A through 4C include schematic diagrams illustrating sensor misalignment in an automotive radar system. Specifically, FIG. 4A illustrates a vehicle equipped with an automotive radar system moving along a path in the presence of one or more stationary or non-stationary clutter objects, for example, one or more trees. FIG. 4B illustrates a plot in the x-y plane of multiple detections of the clutter object, i.e., tree, obtained by the automotive radar system in the vehicle of FIG. 4A as the vehicle moves along the path. FIG. 4C illustrates a plot in the x-y plane of multiple detections of the clutter object, i.e., tree, obtained by the automotive radar system in the vehicle of FIG. 4A as the vehicle moves along the path, with radar sensor misalignment.

Referring to FIG. 4A, vehicle 50 moves along a path indicated by arrow 73. One or more stationary or non-stationary clutter objects such as one or more trees 70 are located adjacent to the path and are detected by the radar system resident in vehicle 70. FIG. 4B illustrates a plot in the x-y plane of multiple, e.g., six, detections of tree 70 as vehicle 50 moves. As illustrated in FIG. 4B, if there is no sensor misalignment, the multiple detections 72A through 72F form a straight line in the x-y plane parallel to the direction of motion 73 of vehicle 50. As illustrated in FIG. 4C, if sensor misalignment is present, then the line of detections 74A through 74F plotted in the x-y plane will form an angle with respect to the direction of motion 73 of vehicle 50. The angle that line forms with the direction of motion 73 of vehicle 50 provides an indication of the misalignment of the sensor in vehicle 50. According to the present disclosure, that angle id determined and is used to indicate the misalignment of the sensor.

The schematic diagrams of FIGS. 4A through 4C are intended to illustrate the approach to determining sensor misalignment according to the present disclosure. In actual practice, according to some exemplary embodiments, more than a single clutter object, i.e., tree 70, is used for detections. Furthermore, because multiple clutter targets are used to providing multiple line patterns, according to some exemplary embodiments, it is not necessary to associate target detections from detection cycle to detection cycle. It is sufficient according to the exemplary embodiments to identify the clutter object detection patterns, i.e., lines, and determine their angles to arrive at a determination of sensor misalignment. For example, by plotting hundreds of persistent detections, a set of patterns, i.e., lines, is obtained. These lines can be detected, and their angle can be determined to indicate misalignment of the associated sensor.

According to the present disclosure, when the radar sensor is mounted on a moving vehicle, the detections will lie in a set of parallel lines as the vehicle moves past stationary clutter. This can be explained since a single target, for example, a tree, generates a single line as it moves past the detector. Looking at a single target may give an erroneous result, because any one target may have some missed detections, or it may have been a moving target when a stationary target was expected. According to the approach of the present disclosure, by looking at many hundreds of targets, lines are built up, so that even if any one target does not give an ideal result, the set of many targets will give a good overall result.

According to some particular exemplary embodiments, this misalignment approach can be used as a "gross" misalignment detection system, which can detect a wide range of misalignment angles. For example, in some particular exemplary embodiments, the approach of the disclosure can be used to detect misalignment angles in a range of approximately −90 degrees to +90 degrees. The approach can also be implemented to detect even larger misalignment angles. Furthermore, the misalignment detection approach of the present disclosure can be used to detect sensor misalignment up to and including a complete inversion of the sensor from the prescribed orientation of the sensor. That is, the approach of the present disclosure can be used to detect if the sensor has been installed in the vehicle upside-down, which is a common production assembly error. Also, the approach of the present disclosure can be used in combination with other misalignment approaches used as "fine" misalignment detection systems. For example, other sensor misalignment approaches can have an angular detection range of approximately −10 degrees to +10 degrees. In such systems, it is a common problem that misalignments out of the prescribed range will yield incorrect results. Thus, the present misalignment detection approach can be an important complement to such fine misalignment approaches.

Hence, according to the approach of the present disclosure, vehicles and stationary target objects are used to estimate sensor alignment. Furthermore, the approach can also report if the sensor is installed upside-down. A tracker is not used with the approach. The approach provides simplicity and speed of operation with fewer failure points then previous approaches. Also, according to the present approach, only position of target objects is used. Velocity determinations are not required. This greatly improves the speed and efficiency and reduces the operational and processing complexity of the approach. If is also noted that the present approach operates with various types of clutter objects, with or without the presence of a guardrail.

Figure 5:
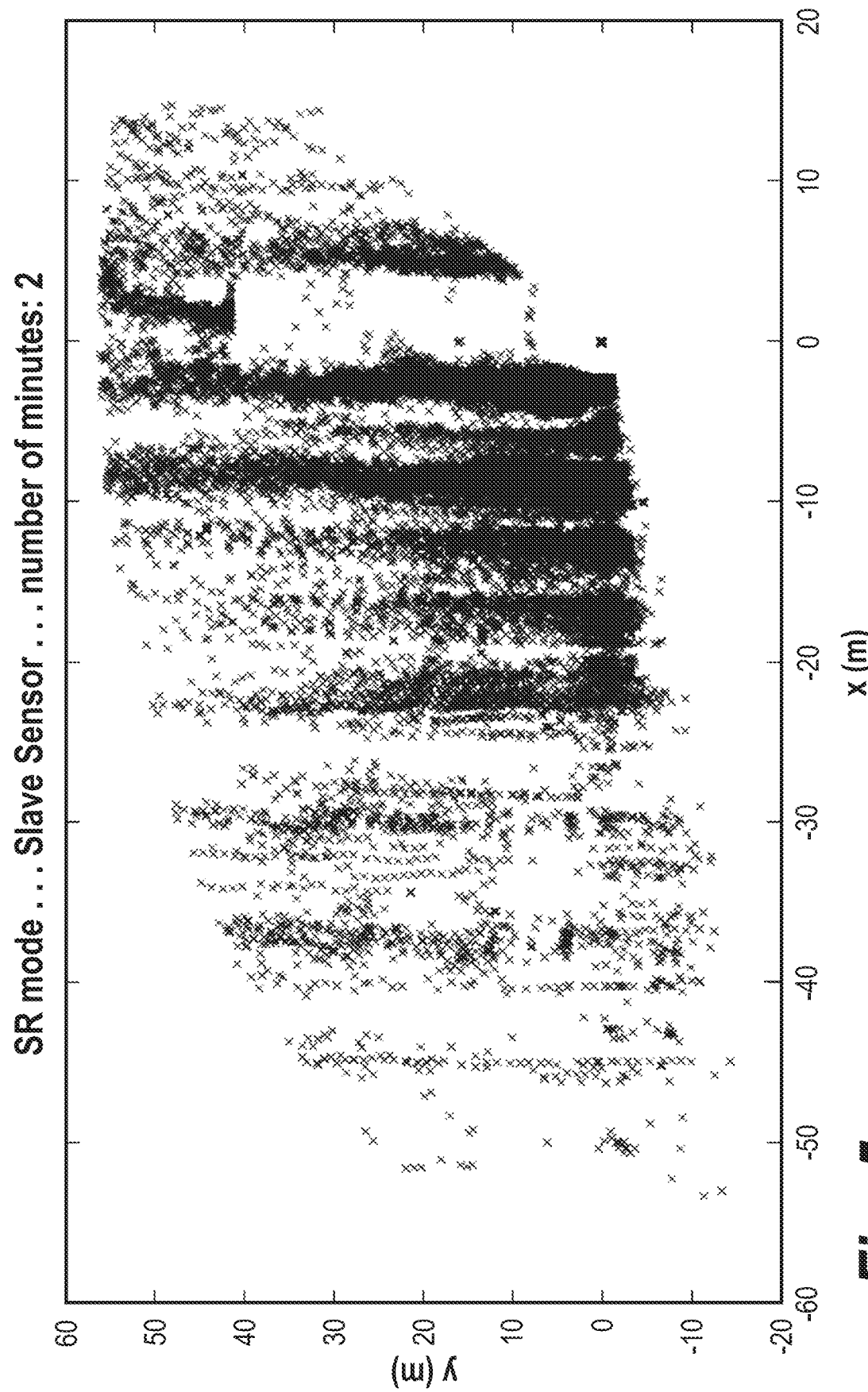
FIG. 5 includes an image of detections obtained by the sensor misalignment approach of the present disclosure, according to some exemplary embodiments.

FIG. 5 includes an image of detections obtained by the sensor misalignment approach of the present disclosure, according to some exemplary embodiments. Referring to FIG. 5, the large number of detections, on the order of hundreds of detections, of multiple clutter objects, are plotted on an x-y Cartesian coordinate plane. This approach is a persistent detection approach in that multiple detections are captured over a non-instantaneous time period. For example, in some particular exemplary embodiments, detections are collected over several seconds or minutes.

Referring to FIG. 5, several patterns, i.e., lines are illustrated in the detections. Each of these lines is due to a single clutter object, e.g., tree. The angle of the lines with respect to the vertical, i.e., y, axis, which by convention is assumed to be the direction of motion of the vehicle, indicates the alignment of the sensor. The approach of the disclosure estimates the angle of the patterns, i.e., lines, to determine the angle of misalignment of the sensor.

In some cases, an excessive quantity of detections can be obtained. In this case, it is important to be able to limit the number of detections such that meaningful results can be obtained. FIGS. 6A through 6D include schematic plots of raw target clutter object detections and approaches to limiting the quantity of detections, according to some exemplary embodiments. Referring to FIG. 6A, the initial detection data includes such a large number of detections that patterns or lines in the data are not readily discernible. As a result, the misalignment angle of the sensor cannot be determined from these detection data. FIG. 6B includes the data of FIG. 6A, with a limitation applied to reduce the number of detections. In the particular embodiment of FIG. 6B, a threshold maximum quantity of detections is selected to be 3000 detection points. It will be understood that any number can be selected based on the raw data and the desired detection outcome. As shown in FIG. 6B, with this detection threshold applied, patterns, i.e., lines, of detections are readily discernible. As a result, the angles of these lines, and, therefore, the sensor misalignment angle, can be determined.

FIGS. 6C and 6D illustrate another approach to limiting clutter object detections, according to some exemplary embodiments. Referring to FIG. 6C, the initial detection data includes excess detections, such that misalignment angle can be difficult to determine. According to some exemplary embodiments, the quantity of detections is reduced by applying a grid detection approach to the raw data. The resulting reduced detection data is illustrated in FIG. 6D. According to this grid detection approach, the detection data are filtered on a grid which is superimposed over the x-y detection data. Each grid is permitted only a predetermined quantity of detections. That is, a threshold maximum number of detections is set for each grid. Within each grid, detections which exceed the threshold are eliminated. In one particular embodiment, for example, each grid is sized to by 1.0 by 1.0 meter, and within each 1.0×1.0 m grid, only a single clutter object detection is allowed. The result of this grid detection filtering is illustrated in FIG. 6D. As can be seen from FIG. 6D, once again, discernible clutter object detection lines, which can be used to determine misalignment angle of the sensor, are obtained.

Figure 7A:
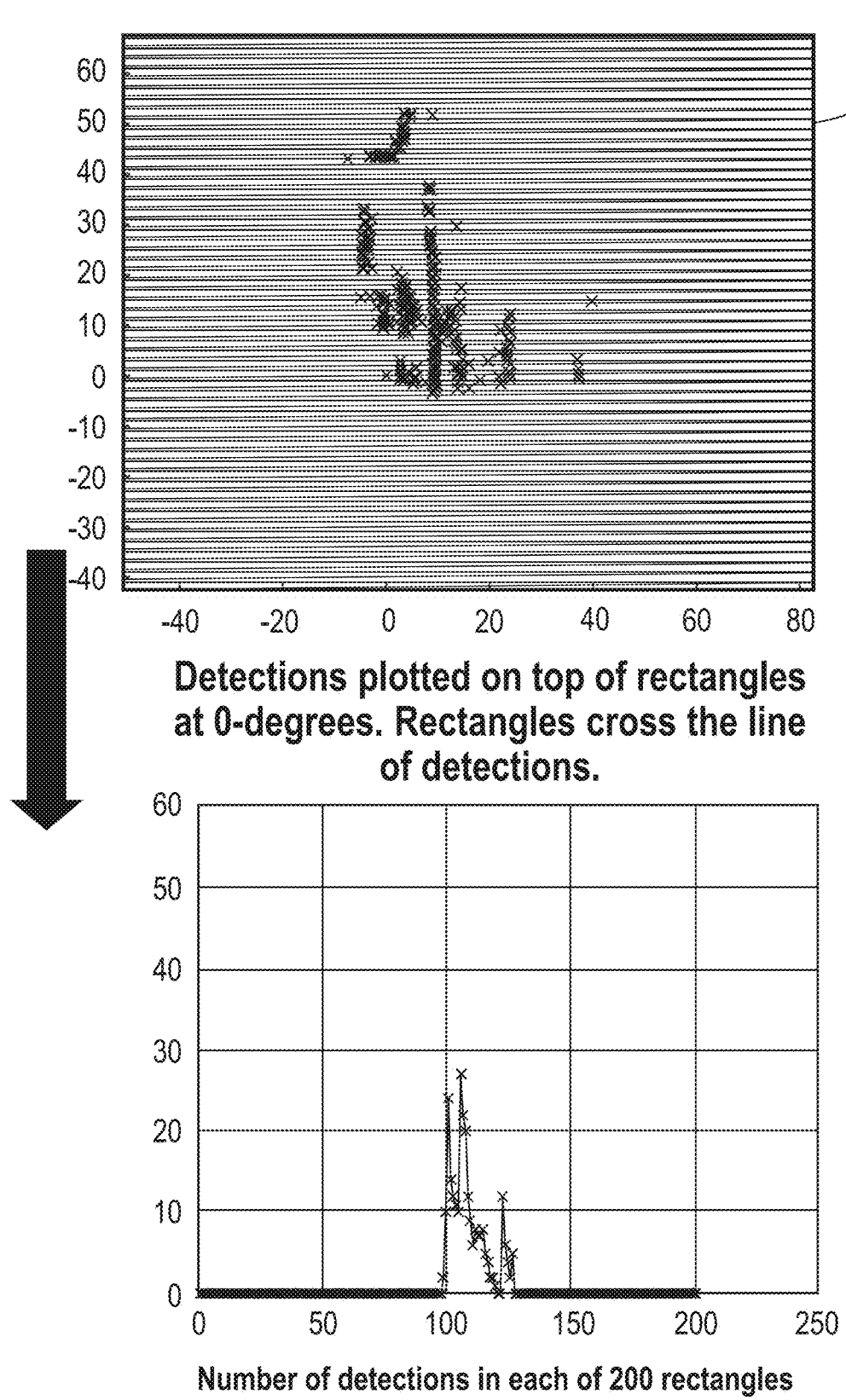
FIGS. 7A and 7B include schematic diagrams of rotating rectangles superimposed over clutter object x-y detection data, used in determining sensor alignment angle, according to some exemplary embodiments.
Figure 7B:
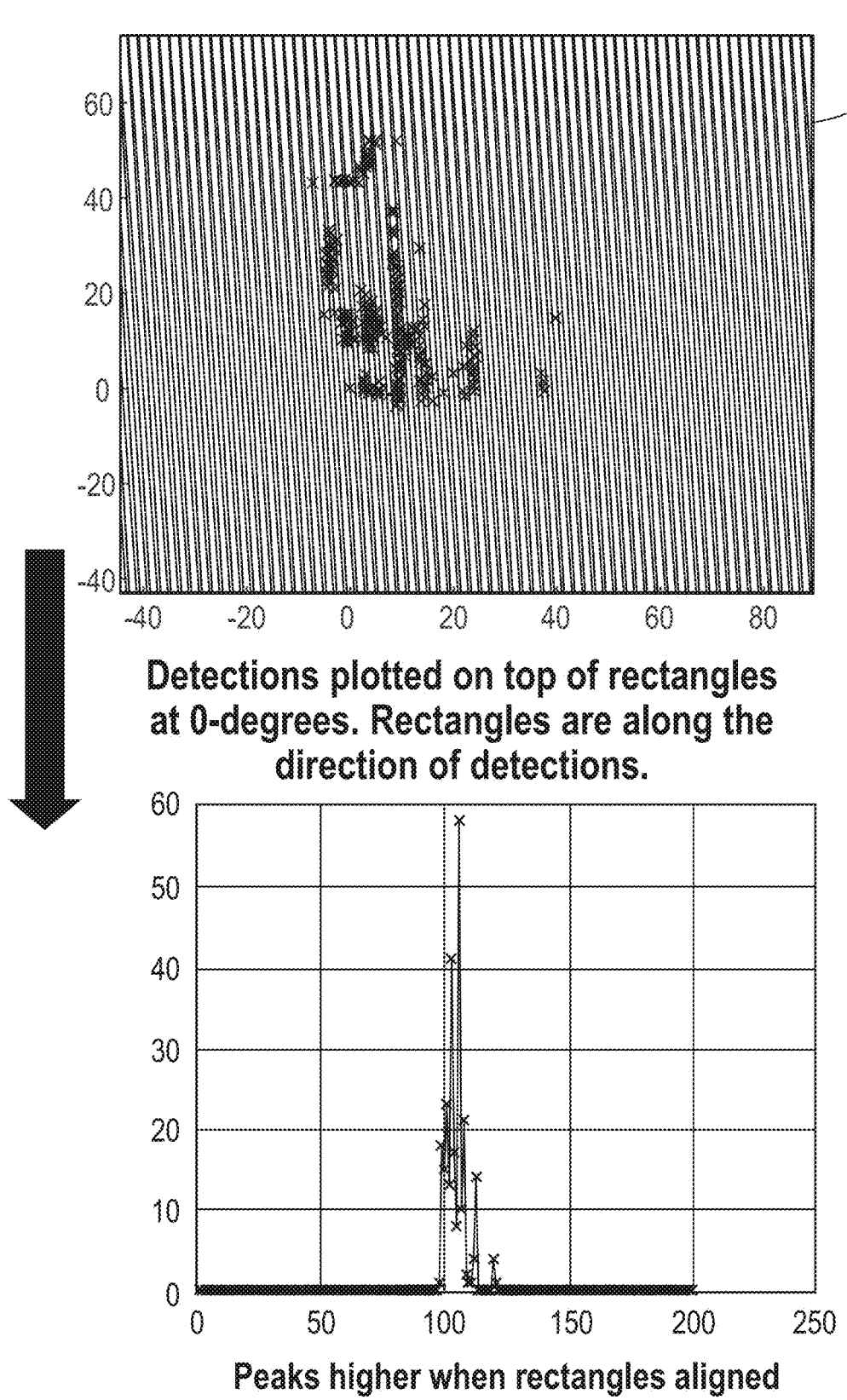

According to some exemplary embodiments, the angle of the patterns or lines of clutter object detections in the x-y plane is determined by a "rotating rectangle" approach. The approach is illustrated in FIGS. 7A and 7B, which include schematic diagrams of rotating rectangles superimposed over the clutter object x-y detection data, used in determining sensor misalignment angle, according to some exemplary embodiments. Referring to FIGS. 7A and 7B, under this approach of the present disclosure, a "fence" of thin rectangles is generated and superimposed over the clutter object detection x-y data, at a series of angles. That is, the thin rectangles are rotated over the clutter object detection x-y data through a series of angles. At each angle, the number of detections within each rectangle is counted. According some exemplary embodiments, the rotation angle of the rectangles at which the maximum count is obtained is identified as the misalignment angle of the sensor.

Referring to FIG. 7A, the "fence" of rectangles 80 is shown superimposed over the clutter object x-y detection data. Also shown is a graph of the number of detections in each of 200 of the rectangles. In FIG. 7A, the rectangles are positioned at an angle that is essentially across the lines of detections. As a result, as shown in the graph of FIG. 7A, relatively few detections are captured in each rectangle. In contrast, in FIG. 7B, the rectangles 80 are positioned essentially along the direction of the lines of detections. As a result, the graph of detections within the rectangles of FIG. 7B shows much higher peaks in the quantity of detections per rectangle. This is due to the fact that the angle of the rectangles 80 is close to the angle of the lines of detections and, therefore, the angle of misalignment of the sensor. In accordance with the exemplary embodiments, the angle of the rectangles that produces the highest peaks in the graph of FIG. 7B is determined to be the angle of misalignment of the sensor.

FIGS. 8A through 8G include schematic illustrations of the "rotating rectangles" approach of the present disclosure to determining a misalignment angle of a sensor, according to some exemplary embodiments. In the exemplary case of FIGS. 8A through 8G, the sensor is misaligned by a misalignment angle of 20 degrees. It will be understood that this angle is selected merely as an illustrative example and that the disclosure is applicable to any misalignment angle.

Figure 8A:
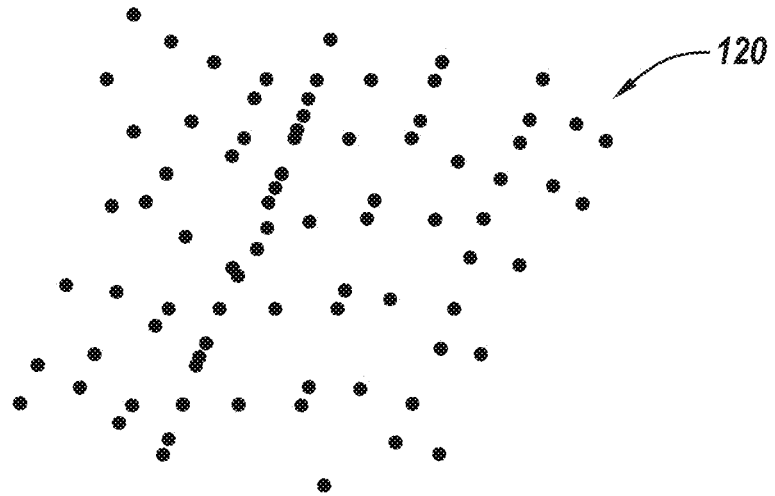
FIGS. 8A through 8G include schematic illustrations of the rotating rectangles approach of the present disclosure to determining a misalignment angle of a sensor, according to some exemplary embodiments.
Figure 8B:
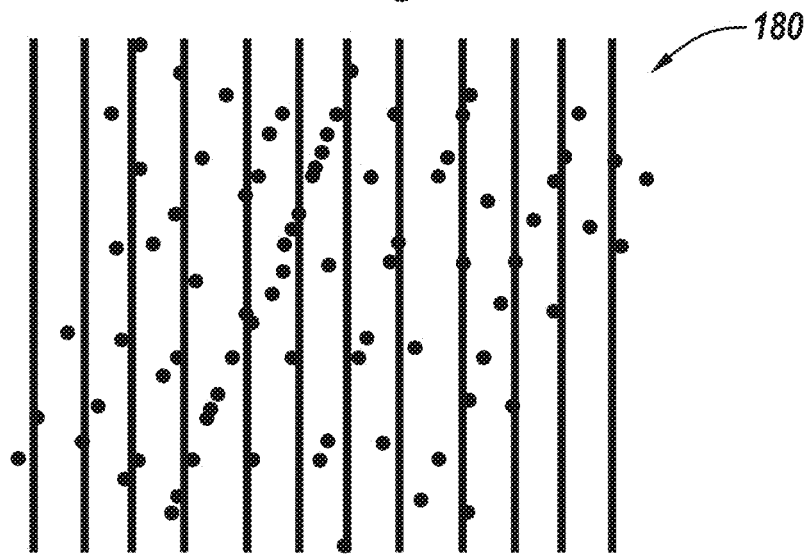

FIG. 8A includes a schematic diagram of a plurality of detections plotted in the x-y plane. Each circular dot represents a detection of an object generated by the detection system of the present disclosure. FIG. 8B is a schematic diagram of the x-y plane and detections of FIG. 8A, with the "fence" or grid of rectangles 180 superimposed over detections 120 at an angle of rotation of zero degrees. In this particular illustrative embodiment, the grid of rectangles includes eleven (11) rectangles. According to exemplary embodiments, the quantity of detections within each rectangle is tabulated, as listed on FIG. 8B. Next, the sum of the top five, for example, quantities in computed and tabulated. In this particular illustrative embodiment, the tabulated total number of detections for zero degrees of rotation is 47.

Figure 8C:
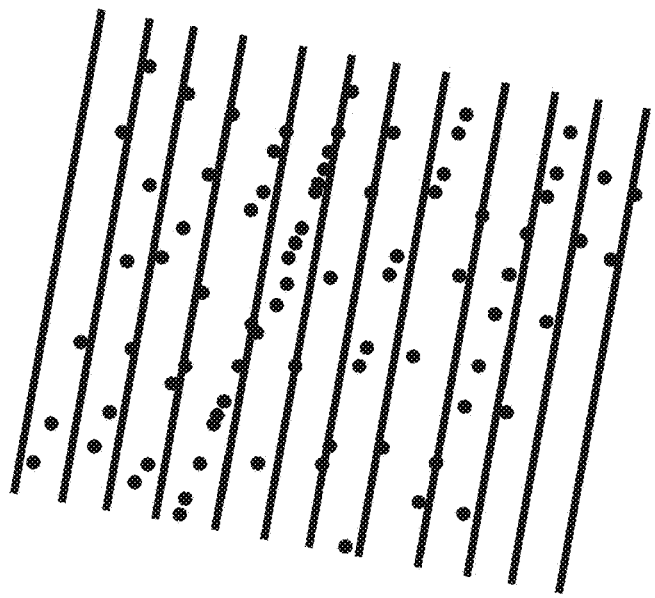
Figure 8D:
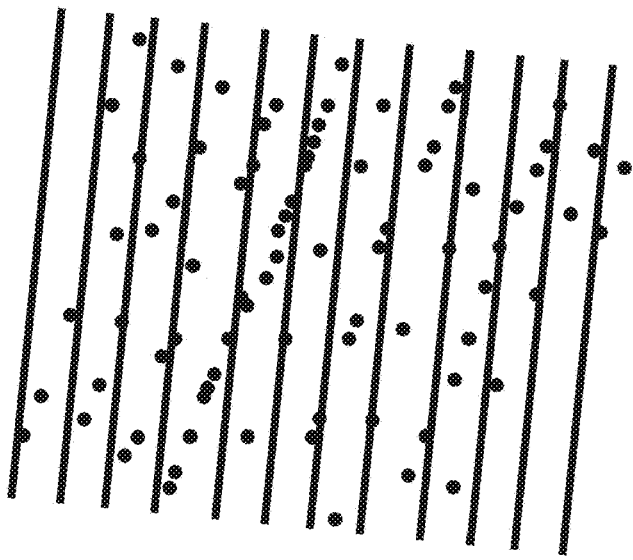
Figure 8E:
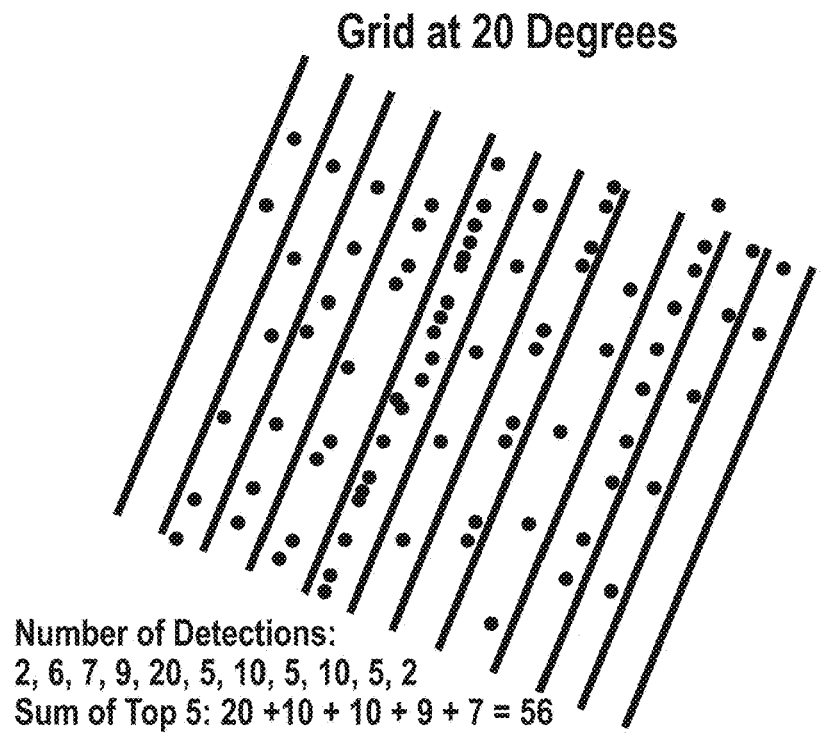
Figure 8F:
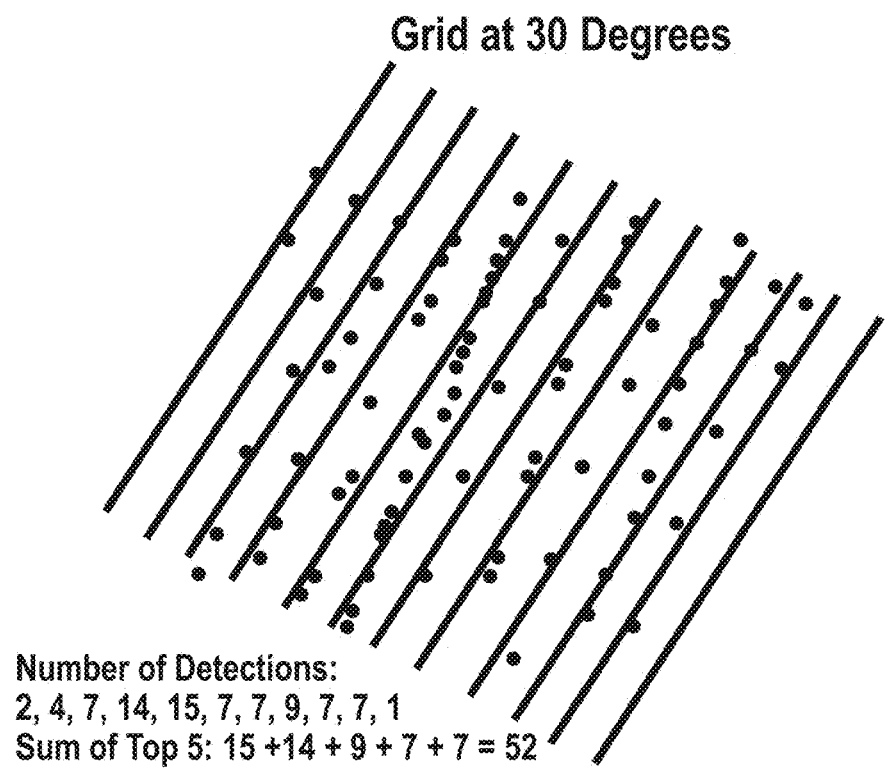

Next, the grid of rectangles is "rotated" to another angle, and the process of tabulating the total of detections in the rectangles is repeated. Referring to FIG. 8C, at an angle of ten degrees, the sum of the top five rectangles is 49. FIG. 8D illustrates the case in which the grid of rectangles is rotated to an angle of 15 degrees. In this case, the sum of the top five rectangles is 50. Referring to FIG. 8E, at a rotational angle of 20 degrees, the sum of the top five rectangles is 56. Referring to FIG. 8F, at a rotational angle of 30 degrees, the sum of the top five rectangles is 52.

Figure 8G:
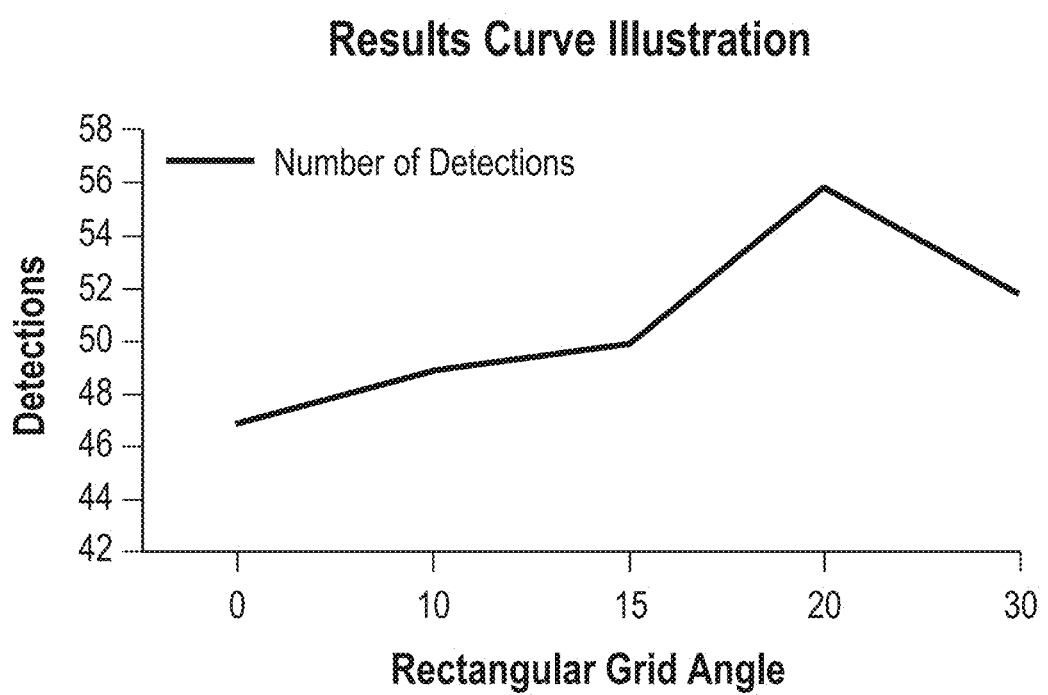

FIG. 8G is a graph of the sum of the top five rectangles in the grid of rectangles for each of the rotational angles illustrated in FIGS. 8B through 8F. As shown schematically in the graph, the maximum number of activations in the top five rectangles in the grid occurs when the grid is rotated 20 degrees. Therefore, according to exemplary embodiments, it is concluded that the sensor is misaligned by 20 degrees.

Figure 9A:
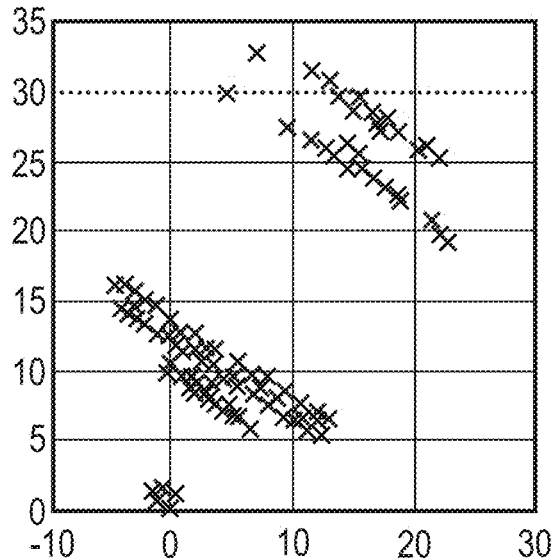
FIGS. 9A through 9D include curves illustrating an approach to determining a figure of merit based on confidence in a sensor alignment angle determination, according to some exemplary embodiments.
Figure 9B:
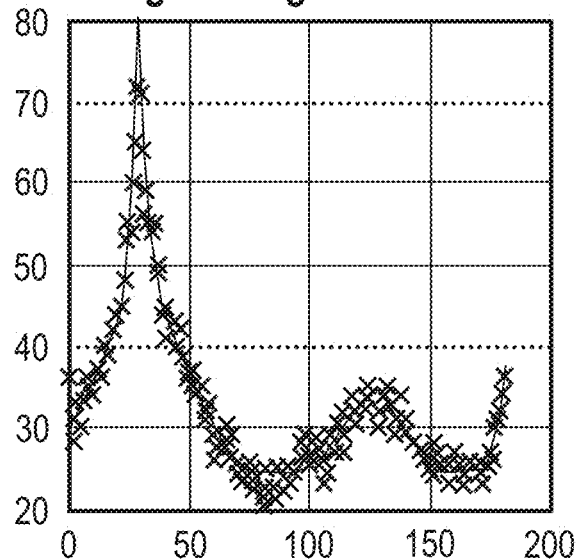

According to some exemplary embodiments, a figure of merit based on the level of confidence in alignment angle determination can be obtained. FIGS. 9A through 9D are curves illustrating an approach to determining the figure of merit based on confidence in the alignment angle determination, according to some exemplary embodiments. FIG. 9A includes a curve of the grid-filtered clutter object detections obtained for a particular exemplary set of detections. From the approach of rotating rectangles described in detail above, an angular alignment curve illustrated in FIG. 9B, for the detections of FIG. 9A, is obtained. The angular alignment curve is a plot of the maximum number of activations at each rotational angle of the rectangles 80 during the process of determining the alignment angle for the sensor. As shown in FIG. 9B, the angular alignment curve in the case of the detections of FIG. 9A is smooth and single-peaked. As a result, from this angular alignment curve, it is concluded that this alignment angle determination is a high-confidence solution.

Figure 9C:
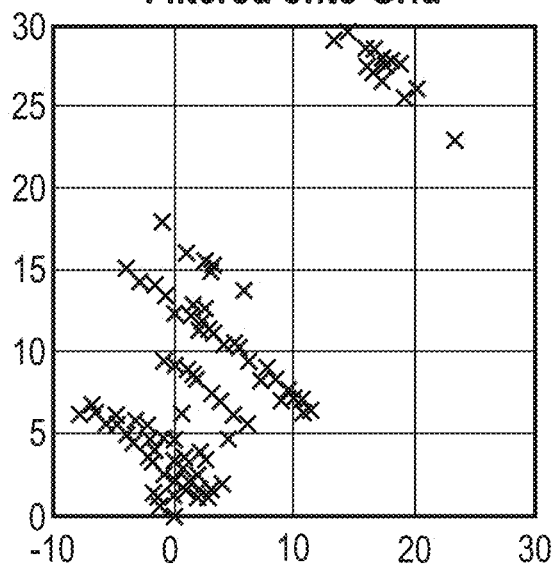
Figure 9D:
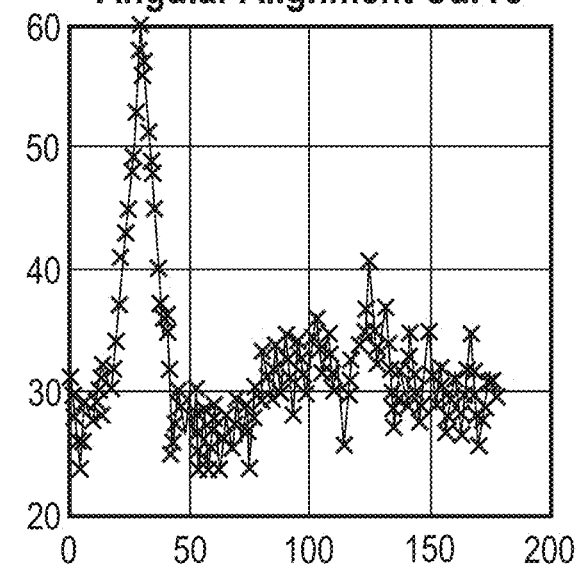

In contrast, FIG. 9C includes a curve of the grid-filtered clutter object detections obtained for a different exemplary set of detections. The angular alignment curve of FIG. 9D for the detections of FIG. 9C is concluded to indicate that the alignment angle determination based on the detections of FIG. 9C a low-confidence result. This is due to the fact that the primary peak in the curve of FIG. 9D is not high enough, and the secondary peak is too high.

As described above, the approach of the disclosure determines an alignment angle of a radar sensor in an automotive radar system. In some embodiments, when misalignment of the radar sensor is larger than some predetermined threshold misalignment angle, such as, for example, 10 degrees of misalignment, then the system can generate an alert. In response to the alert, the user can physically alter the alignment of the sensor, such as by reinstalling the sensor, to correct the misalignment. Alternatively, or in addition, in response to the alert, the radar system can disable one or more of its features. For example, in response to the misalignment alert, the radar system can disable one or more of a blind spot detection feature, a rear cross traffic detection feature or other such feature of the automotive radar system.

It is noted that the disclosure describes in detail misalignment of a sensor in an automotive detection system using azimuthal angular misalignment as an illustrative exemplary embodiment. It will be understood by those skilled in the art that the present disclosure is applicable to other misalignments, such as vertical (elevational) angular misalignment and any combination of azimuthal and elevational misalignment.

Throughout the foregoing, the disclosure relates to an approach to detecting and compensating for sensor misalignment in an automotive detection system, such as an automotive radar or LiDAR detection system. It should be noted that the foregoing is also applicable to detection systems other than automotive detection systems.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. An automotive detection system with monitoring of misalignment of a sensor of the system, comprising:
    a signal transmitter for transmitting transmitted signals into a region;
    a receiver for receiving reflected signals generated by reflection of the transmitted signals and generating receive signals indicative of the reflected signals; and
    a processor coupled to the receiver for:
    (i) receiving the receive signals,
    (ii) processing the receive signals to generate detections of one or more objects in the region, each of the detections being associated with a position in a two-dimensional orthogonal coordinate system in a plane in which the sensor is moving,
    (iii) superimposing a grid of parallel lines over the detections within the two-dimensional orthogonal coordinate system,
    (iv) determining an angle of an axis of the grid with respect to a reference direction in the two-dimensional orthogonal coordinate system,
    (v) calculating a quantity of detections within the grid by calculating a number of detections having coordinates within each pair of parallel lines to determine, for a predetermined number of pairs of parallel lines, the pairs of parallel lines encompassing the highest number of detections, and summing the detections within the pairs of parallel lines encompassing the highest number of detections to obtain the quantity,
    (vi) rotating the grid in the plane to change the angle of the axis of the grid with respect to the reference direction and repeating step (v),
    (vii) repeating step (vi) a plurality of times,
    (viii) comparing the quantity of detections within the grid at each rotation to determine a grid having the highest quantity, and (ix) determining an angle of misalignment of the sensor equal to the angle of the axis of the grid having the highest quantity.

2. The automotive detection system of claim 1, wherein:
the automotive detection system is a radar system;
the signal transmitter is a radar signal transmitter;
the transmitted signals are transmitted radar signals;
the reflected signals are reflected radar signals; and
the sensor is a radar sensor.

3. The automotive detection system of claim 1, wherein:
the automotive detection system is a LiDAR system;
the signal transmitter is a LiDAR signal transmitter;
the transmitted signals are transmitted LiDAR signals;
the reflected signals are reflected LiDAR signals; and
the sensor is a LiDAR sensor.

4. The automotive detection system of claim 1, wherein the processor filters the detections by limiting a quantity of detections in each of the grids within the two-dimensional orthogonal coordinate system.

5. The automotive detection system of claim 1, wherein the reference direction is the direction in which the sensor is moving in the plane.

6. The automotive detection system of claim 1, wherein the detections are concluded by the processor to be associated with an object which is stationary with respect to the sensor.

7. The automotive detection system of claim 6, wherein the object comprises a tree near a road on which the detection sensor is moving.

8. The automotive detection system of claim 1, wherein, if the angle of misalignment of the sensor exceeds a threshold angle, then an alert is issued.

9. The automotive detection system of claim 8, wherein, in response to the alert, at least one feature of the detection system is disabled.

10. The automotive detection system of claim 9, wherein the disabled feature is a blind spot detection feature.

11. The automotive detection system of claim 9, wherein the disabled feature is a rear cross traffic detection feature.

12. The automotive detection system of claim 8, wherein the alert indicates that the sensor is inverted with respect to a prescribed orientation.

13. A method for monitoring alignment of a sensor in an automotive detection system, comprising:
(a) transmitting transmitted signals into a region;
(b) receiving reflected signals generated by reflection of the transmitted signals and generating receive signals indicative of the reflected signals;
(c) receiving the receive signals;
(d) processing the receive signals to generate detections of one or more objects in the region, each of the detections being associated with a position in a two-dimensional orthogonal coordinate system in a plane in which the sensor is moving;
(e) superimposing a grid of parallel lines over the detections within the two-dimensional orthogonal coordinate system;
(f) determining an angle of an axis of the grid with respect to a reference direction in the two-dimensional orthogonal coordinate system;
(g) calculating a quantity of detections within the grid by calculating a number of detections having coordinates within each pair of parallel lines to determine, for a predetermined number of pairs of parallel lines, the parallel lines encompassing the highest number of detections, and summing the detections within the pairs of parallel lines encompassing the highest number of detections to obtain the quantity;
(h) rotating the grid in the plane to change the angle of the axis of the grid with respect to the reference direction and repeating step (g);
(i) repeating step (h) a plurality of times;
(j) comparing the quantity of detections within the grid at each rotation to determine a grid having the highest quantity; and
(k) determining an angle of misalignment of the sensor equal to the angle of the axis of the grid having the highest quantity.

14. The method of claim 13, wherein:
the automotive detection system is a radar system;
the transmitted signals are transmitted radar signals;
the reflected signals are reflected radar signals; and
the sensor is a radar sensor.

15. The method of claim 13, wherein:
the automotive detection system is a LiDAR system;
the transmitted signals are transmitted LiDAR signals;
the reflected signals are reflected LiDAR signals; and
the sensor is a LiDAR sensor.

16. The method of claim 13, further comprising filtering the detections by limiting a quantity of detections in each of the grids within the two-dimensional orthogonal coordinate system.

17. The method of claim 13, wherein the reference direction is the direction in which the sensor is moving in the plane.

18. The method of claim 13, further comprising concluding that the detections are associated with an object which is stationary with respect to the radar sensor.

19. The method of claim 18, wherein the object comprises a tree near a road on which the sensor is moving.

20. The method of claim 13, further comprising issuing an alert if the angle of misalignment of the sensor exceeds a threshold angle.

21. The method of claim 20, further comprising disabling at least one feature of the detection system in response to the alert.

22. The method of claim 21, wherein the disabled feature is a blind spot detection feature.

23. The method of claim 21, wherein the disabled feature is a rear cross traffic detection feature.

24. The method of claim 20, wherein the alert indicates that the sensor is inverted with respect to a prescribed orientation.

* * * * *